(12) United States Patent
Higuchi et al.

(10) Patent No.: US 11,647,134 B2
(45) Date of Patent: May 9, 2023

(54) RECORDING APPARATUS

(71) Applicant: SEIKO EPSON CORPORATION, Tokyo (JP)

(72) Inventors: Tomoyuki Higuchi, Shiojiri (JP); Wataru Suzuki, Shiojiri (JP); Mugio Kawasaki, Suwa (JP); Yoshiyuki Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/305,962

(22) Filed: Jul. 19, 2021

(65) Prior Publication Data

US 2022/0030125 A1   Jan. 27, 2022

(30) Foreign Application Priority Data

Jul. 21, 2020   (JP) .............................. JP2020-124426

(51) Int. Cl.
*G06F 3/041* (2006.01)
*H04N 1/00* (2006.01)

(52) U.S. Cl.
CPC ..... *H04N 1/00559* (2013.01); *H04N 1/00384* (2013.01); *H04N 1/00411* (2013.01); *H04N 1/00493* (2013.01); *H04N 1/00496* (2013.01)

(58) Field of Classification Search
CPC ........... H04N 1/00559; H04N 1/00384; H04N 1/00411; H04N 1/00493; H04N 1/00496
USPC ......................................... 345/156, 173, 174
See application file for complete search history.

(56) References Cited

U.S. PATENT DOCUMENTS

| | | | |
|---|---|---|---|
| 2005/0128272 A1* | 6/2005 | Morohoshi ............ | B41J 2/2107 347/100 |
| 2007/0228232 A1* | 10/2007 | Ikeno ..................... | F16M 11/10 248/157 |
| 2009/0086173 A1* | 4/2009 | Combs ....................... | B41J 3/46 353/122 |
| 2011/0199638 A1 | 8/2011 | Ogino et al. | |
| 2014/0043419 A1* | 2/2014 | Otsuka .................. | B41J 3/4071 347/104 |
| 2014/0085671 A1* | 3/2014 | Nakagawa .......... | G06F 3/04883 358/1.15 |
| 2015/0146095 A1* | 5/2015 | Yano ........................ | H04N 7/15 348/376 |
| 2017/0045991 A1* | 2/2017 | Watanabe .......... | H04N 1/00411 |
| 2017/0230578 A1* | 8/2017 | Kitaya ............. | H04N 5/232933 |
| 2017/0235413 A1* | 8/2017 | Koizumi ............... | G06F 3/0445 345/174 |
| 2018/0188874 A1* | 7/2018 | Cho ...................... | H03K 17/96 |
| 2018/0329494 A1* | 11/2018 | Hernandez Santisteban ............... G06F 3/016 |

(Continued)

FOREIGN PATENT DOCUMENTS

| | | |
|---|---|---|
| JP | 2011-170070 A | 9/2011 |
| JP | 2016-197201 | 11/2016 |
| JP | 2017-030305 A | 2/2017 |

*Primary Examiner* — Thuy N Pardo
(74) *Attorney, Agent, or Firm* — Workman Nydegger

(57) ABSTRACT

A recording apparatus includes a recording section that records information on a medium; a main body provided with the recording section; and a tilt panel that allows a setting operation of the main body. The tilt panel is configured to pivot in a touch direction. The tilt panel includes: a touch panel disposed on a front surface of the tilt panel; and a power button disposed on a part of a periphery of the tilt panel, a press direction of the power button intersecting the touch direction of the touch panel.

9 Claims, 12 Drawing Sheets

(56) References Cited

U.S. PATENT DOCUMENTS

2020/0302865 A1* 9/2020 Lu ..................... G09G 3/2003
2021/0124538 A1* 4/2021 Miki .................. G06F 3/1229

* cited by examiner

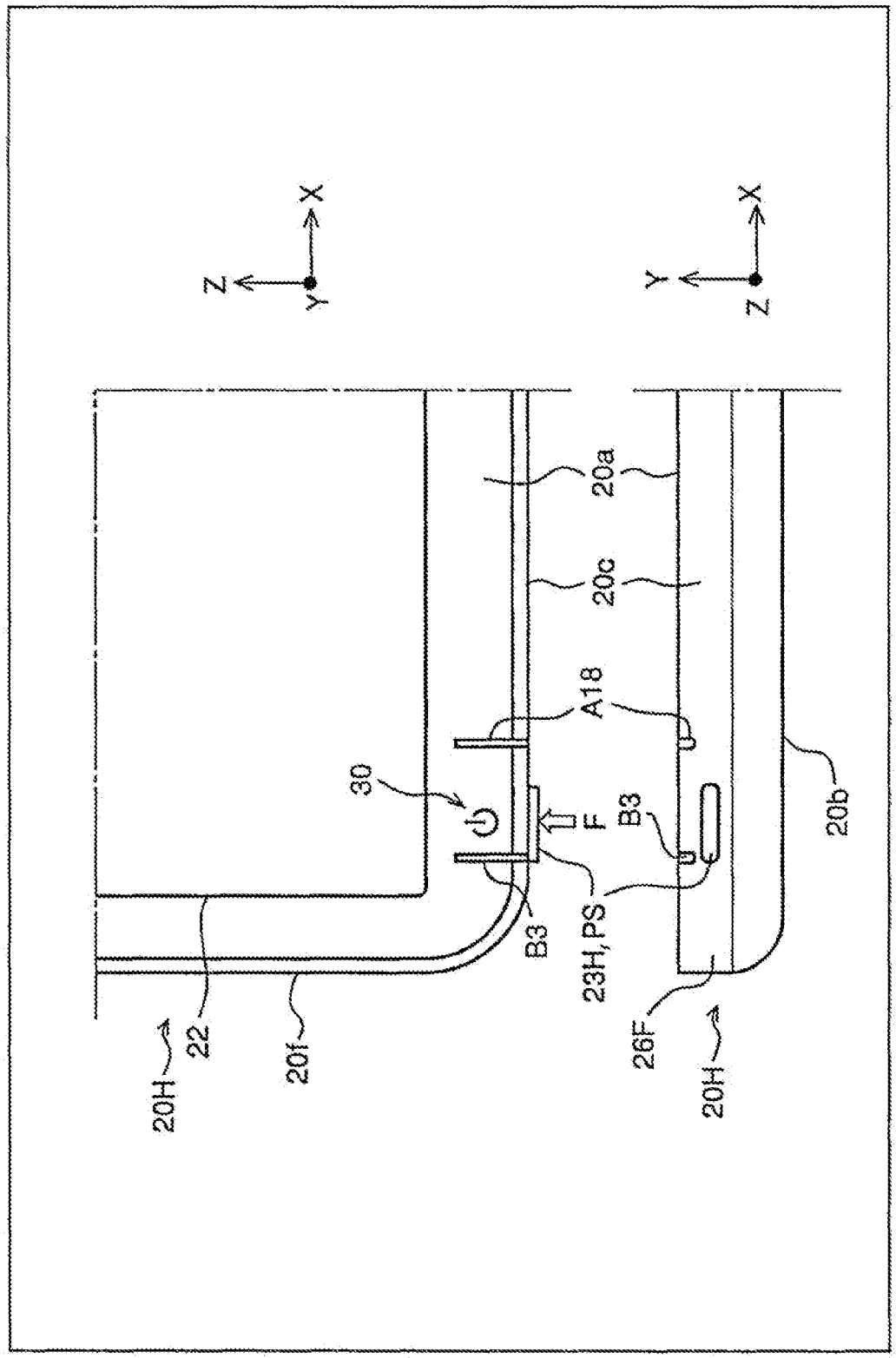

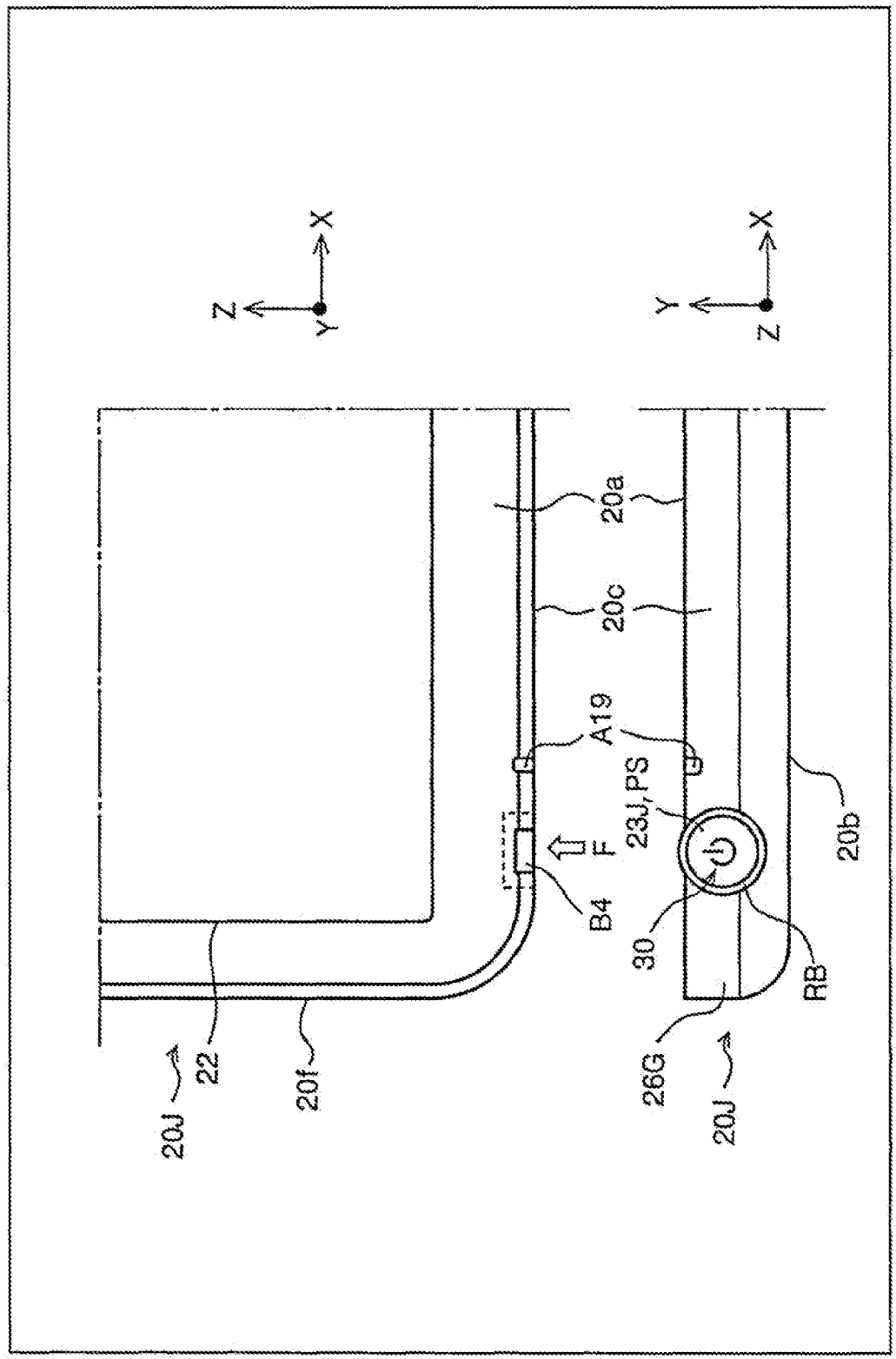

RECORDING APPARATUS

The present application is based on, and claims priority from JP Application Serial Number 2020-124426, filed Jul. 21, 2020, the disclosure of which is hereby incorporated by reference herein in its entirety.

BACKGROUND

1. Technical Field

The present disclosure relates to a recording apparatus that records information on a medium.

2. Related Art

Printers, which are one example of recording apparatuses, typically have an operation panel with a touch panel that allows users' setting operations and a push power button that mechanically turns on or off the main power. As an example, JP-A-2017-030305 discloses a printer that has an operation panel tiltable relative to its main body.

When a user presses the power button on the operation panel in the above-disclosed printer, the pressing force inevitably acts on the operation panel in such a way that its tilt angle changes. As a result, the operation panel may face an unwanted direction or may be temporarily displaced toward the main body of the printer. In this case, the user might feel inconvenient. If an operation panel employs a mechanism that can more firmly keep the tilt angle, the printer may be more expensive or larger-size.

SUMMARY

The present disclosure is a recording apparatus which includes a recording section that records information on a medium; a main body provided with the recording section; and a tilt panel that allows a setting operation of the main body. The tilt panel is configured to pivot in a touch direction. The tilt panel includes: a touch panel disposed on a front surface of the tilt panel; and a power button disposed on a part of a periphery of the tilt panel, a press direction of the power button intersecting the touch direction of the touch panel.

BRIEF DESCRIPTION OF THE DRAWINGS

FIG. 11 is partial front and bottom views of a tilt panel according to an eighth embodiment of the present disclosure.

FIG. 12 is partial front and bottom views of a tilt panel according to a ninth embodiment of the present disclosure.

DESCRIPTION OF EXEMPLARY EMBODIMENTS

Figure 1:
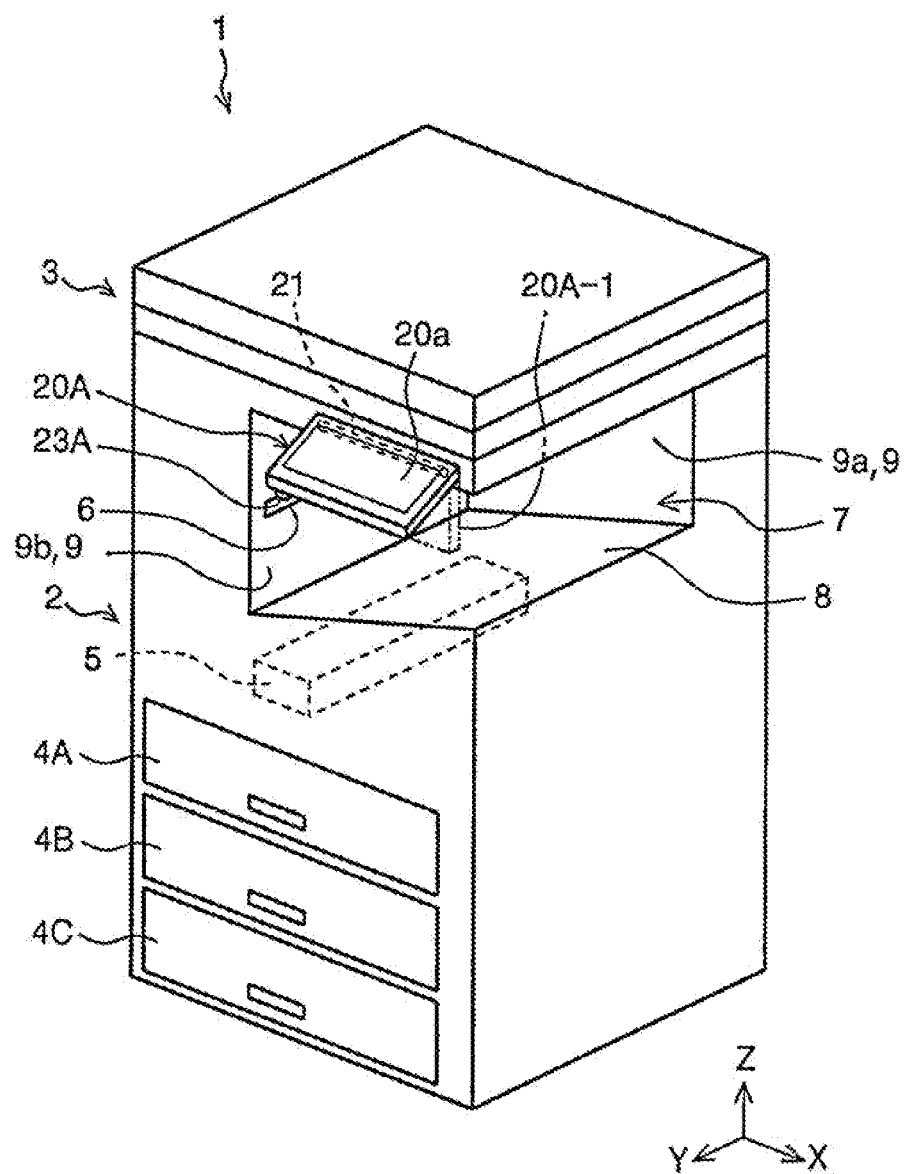
FIG. 1 is a front perspective view of a printer.

Some aspects of the present disclosure will be described below briefly.

According to a first aspect of the present disclosure, a recording apparatus includes a recording section that records information on a medium; a main body provided with the recording section; and a tilt panel that allows a setting operation of the main body. The tilt panel is configured to pivot in a touch direction. The tilt panel includes: a touch panel disposed on a front surface of the tilt panel; and a power button disposed on a part of a periphery of the tilt panel, a press direction of the power button intersecting the touch direction of the touch panel.

In the first aspect, a tilt panel includes: a touch panel disposed on a front surface of the tilt panel; and a power button disposed on a part of a periphery of the tilt panel. A press direction of the power button intersects a touch direction of a touch panel. In which case, the force generated at the press of the power button hardly influences the tilt angle of the tilt panel. Therefore, this configuration successfully reduces the risk of the tilt angle of the tilt panel being accidentally changed or the tilt panel being temporally displaced toward the main body at the press of the power button. Moreover, the configuration successfully reduces the risk of the power button being accidentally pressed during the operation of the touch panel.

According to a second aspect of the present disclosure, the recording apparatus may have a configuration in which the press direction of the power button forms a substantially right angle with the touch direction of the touch panel, in addition to the configuration of the first aspect.

In the second aspect, the press direction of the power button forms a substantially right angle with the touch direction of the touch panel. In which case, the force generated at the press of the power button further hardly influences the tilt angle of the tilt panel. Therefore, this configuration more reliably reduces the risk of the tilt angle of the tilt panel being accidentally changed or the tilt panel being temporally displaced toward the main body at the press of the power button.

According to a third aspect of the present disclosure, the recording apparatus may have a configuration in which the periphery of the tilt panel is formed of a deep color member and the power button is formed of a light color member or a transparent member, in addition to the configuration of the first or second aspect.

In the second aspect, the periphery of the tilt panel is formed of a deep color member, whereas the power button is formed of a light color member or a transparent member. This configuration provides a high color contrast between the periphery of the tilt panel and the power button, thereby contributing to increased visibility of the power button.

According to a fourth aspect of the present disclosure, the recording apparatus may have a configuration in which the power button is surrounded by the deep color member, in addition to the configuration of the third aspect.

In the fourth aspect of the present disclosure, the power button is surrounded by the deep color member. This configuration more reliably provides a high color contrast between the periphery of the tilt panel and the power button, thereby contributing to further increased visibility of the power button.

According to a fifth aspect of the present disclosure, the recording apparatus may have a configuration in which the main body has a casing defining an ejection space, the medium on which the information was recorded is to be ejected into the ejection space, the power button may be disposed so as to at least partly cover the ejection space as seen from front of the main body, and the casing may be formed of a deep color member, in addition to the configuration of the fourth aspect.

In the fifth aspect, the main body has a casing defining an ejection space, the medium on which the information was recorded is to be ejected into the ejection space. The power button is disposed so as to at least partly cover the ejection space as seen from front of the main body. The casing is formed of a deep color member. This configuration provides a high color contrast between the ejection space and the power button as seen from the front of the main body, thereby contributing to further increased visibility of the power button.

According to a sixth aspect of the present disclosure, the recording apparatus may have a configuration in which the power button is configured to light, in addition to the configuration of the fifth aspect.

In the sixth aspect, since the power button is configured to light, this configuration contributes to further increased visibility of the power button.

According to a seventh aspect of the present disclosure, the recording apparatus may have a configuration in which the power button is disposed on a side of the tilt panel which is furthest from a pivot shaft of the tilt panel, in addition to the configuration of one of the first to sixth aspects.

The configuration in the seventh aspect successfully reduces the risk of the pivot shaft being damaged by stress generated at the press of the power button, as opposed to the configuration in which a power button is disposed on a side of a tilt panel which intersects a pivot shaft.

According to an eighth aspect of the present disclosure, the recording apparatus may have a configuration in which the power button is disposed apart from a front surface toward a rear surface of the tilt panel in a thickness direction of the tilt panel, in addition to the configuration of one of the first to seventh aspects.

In the eighth aspect, the power button may be disposed apart from a front surface toward a rear surface of the tilt panel in a thickness direction of the tilt panel. Therefore, this configuration further successfully reduces the risk of the power button being accidentally pressed during the operation of the touch panel.

According to a ninth aspect of the present disclosure, the recording apparatus may have a configuration in which the power button has a surface to be pressed, the surface being substantially flush with or depressed into a surface around the power button in the press direction, in addition to the configuration of one of the first to eighth aspects.

In the ninth aspect, the power button has a surface to be pressed, the surface being substantially flush with or depressed into a surface around the power button in the press direction. Therefore, this configuration successfully reduces the risk of the power button being accidentally pressed, for example, during the inclining of the tilt panel.

An ink jet printer 1 (referred below simply as a printer 1) according to some embodiments of the present disclosure, which is an example of a recording apparatus, will be described in detail below with reference to the accompanying drawings. Those individual drawings employ an X-Y-Z coordinate system: the X-axis extends along the width of the printer 1; the Y-axis extends along the depth of the printer 1 and the width of medium such as a paper sheet; and the Z-axis extends along the height of the printer 1. Herein, the surface of the printer 1 which has a tilt panel 20A is defined as the front surface, whereas the opposite surface of the printer 1 is defined as the rear surface. The direction from the rear surface to the front surface is referred to as the +Y direction, whereas its opposite direction is referred to as the −Y direction. When the printer 1 is seen from the −Y direction, the direction from the left surface of the printer 1 to the right surface is referred to as the +X direction, whereas its opposite direction is referred to as the −X direction. The upper direction is referred to as the +Z direction, whereas the lower direction is referred to as the −Z direction.

First Embodiment

As illustrated in FIG. 1, the printer 1 includes: a main body 2; a recording head 5 inside the main body 2; and a scanner 3 over the main body 2. In this case, the printer 1 may be a multi-function product (MFP) having both an ink jet recording function and a scanning function. Herein, the recording head 5 corresponds to a recording section, and the scanner 3 corresponds to a medium scanning section.

Detachably attached to the lower portion of the main body 2 are paper cassettes 4A, 4B, and 4C, each of which accommodates paper sheets. A transport mechanism (not illustrated) inside the main body 2 feeds a paper sheet from one of the paper cassettes 4A, 4B, and 4C in the +X direction, turns around the paper sheet, and feeds the paper sheet in the −X direction until it reaches the place opposite the recording head 5. Then, the recording head 5 discharges ink onto the paper sheet, thereby recording information thereon. In this embodiment, the recording head 5 may be the so-called line head in which nozzles are arrayed across the whole width of a paper sheet. Thus, the recording head 5 can record the information on the paper sheet without moving in the ±X directions.

The transport mechanism feeds, in the −X direction, the paper sheet on which the information has been recorded by the recording head 5. Then, the transport mechanism turns around the paper sheet, feeds the paper sheet in the +X direction, and ejects the paper sheet into an ejection space 7 via an ejection slot 6, so that the paper sheet is placed over other paper sheets piled on an ejection tray 8. Further, the ejection slot 6 makes the interior of the main body 2 communicate with the ejection space 7.

The ejection space 7 is defined by the ejection tray 8 and a casing 9 of the main body 2. More specifically, the ejection space 7 is defined by the ejection tray 8 and a first surface 9a and a second surface 9b of the casing 9 with its +X and +Y sides being open; the first surface 9a is parallel to the X-Z plane, and the second surface 9b parallel to the Y-Z plane. In this embodiment, all of the first surface 9a, the second surface 9b, and the ejection tray 8 have a black color. Herein, the black color is an example of a deep color; if the deep color is expressed on the 256-level grayscale, its gradation value may range from 0 to 20. Hereinafter, the black colors of other parts may also be expressed by gradation values within this range unless otherwise specified. Except for the first surface 9a, the second surface 9b, and the ejection tray 8, all the parts of the main body 2 and the scanner 3 have a white color. Herein, the white color is an example of a light color; if the light color is expressed on the 256-level grayscale, its gradation value may range from 235 to 255. Hereinafter, the white colors of other parts may also be expressed by gradation values within this range unless otherwise specified.

The front surface of the main body 2 is provided with the tilt panel 20A, which allows user's setting operations of the main body 2 and the scanner 3 and displays set contents and a preview screen of an image to be recorded. It should be noted that the printer 1 is provided with the tilt panel 20A according to the first embodiment; however, the printer 1 may also be provided with any of tilt panels 20B to 20J according to other embodiments which will be described with reference to FIGS. 5 to 12.

The tilt panel 20A is coupled to the main body 2 via a pivot shaft 21 extending along the X-axis. The tilt panel 20A is pivotable around the pivot shaft 21 within the Y-Z plane so that its tilt angle is adjustable. The pivot shaft 21, which may be a free stop hinge, can maintain the tilt panel 20A at any tilt angle. In this embodiment, the tilt panel 20A may have an attitude with a front surface 20a facing obliquely upward, as illustrated with the solid line in FIG. 1. Alternatively, the tilt panel 20A may have an attitude with the front surface 20a facing forward, as illustrated with the alternate long and two short dashes line denoted by 20A-1 in FIG. 1. Also, the tilt panel 20A may have an attitude with the front surface 20a facing upward (not illustrated). The front surface 20a of the tilt panel 20A is seen by a user when he/she operates the printer 1.

Next, the tilt panel 20A will be described with reference to FIGS. 2 to 4. It should be noted that FIG. 4 has a plurality of parts illustrating the tilt panel 20A as seen from different directions: the upper part of FIG. 4 is a front view of the tilt panel 20A; and the lower part of FIG. 4 is a bottom view of the tilt panel 20A. The tilt panel 20A includes: a front surface 20a that acts as a cover glass; a touch panel 22 formed beneath the front surface 20a; and a liquid crystal display (not illustrated) formed beneath the touch panel 22. In this embodiment, the touch panel 22 may be of a capacitance type; however other known types, such as a resistive type, an optical type, and an electromagnetic induction type, are also available. In this embodiment, the user basically operates the front surface 20a of the tilt panel 20A by touching the touch panel 22. The direction (touch direction) in which the user touches the touch panel 22 corresponds to a thickness direction of the tilt panel 20A. For example, when the tilt panel 20A is in an upright position as illustrated with the alternate long and two short dashes line 20A-1 in FIG. 1, the touch direction is the −Y direction; when the tilt panel 20A is in a horizontal position, the touch direction is the −Z direction.

Disposed on the periphery of the tilt panel 20A is a frame member 25A, which includes a lower-side surface 20c, an upper-side surface 20d, a right-side surface 20e, and a left-side surface 20f. In the following description, the orientations, such as the top, bottom, right, and left of a component or icon in the tilt panel 20A will conform to those in the upper part of FIG. 4. In other words, the orientations will be relative to the user when he/she sees the front surface 20a.

Figure 3:
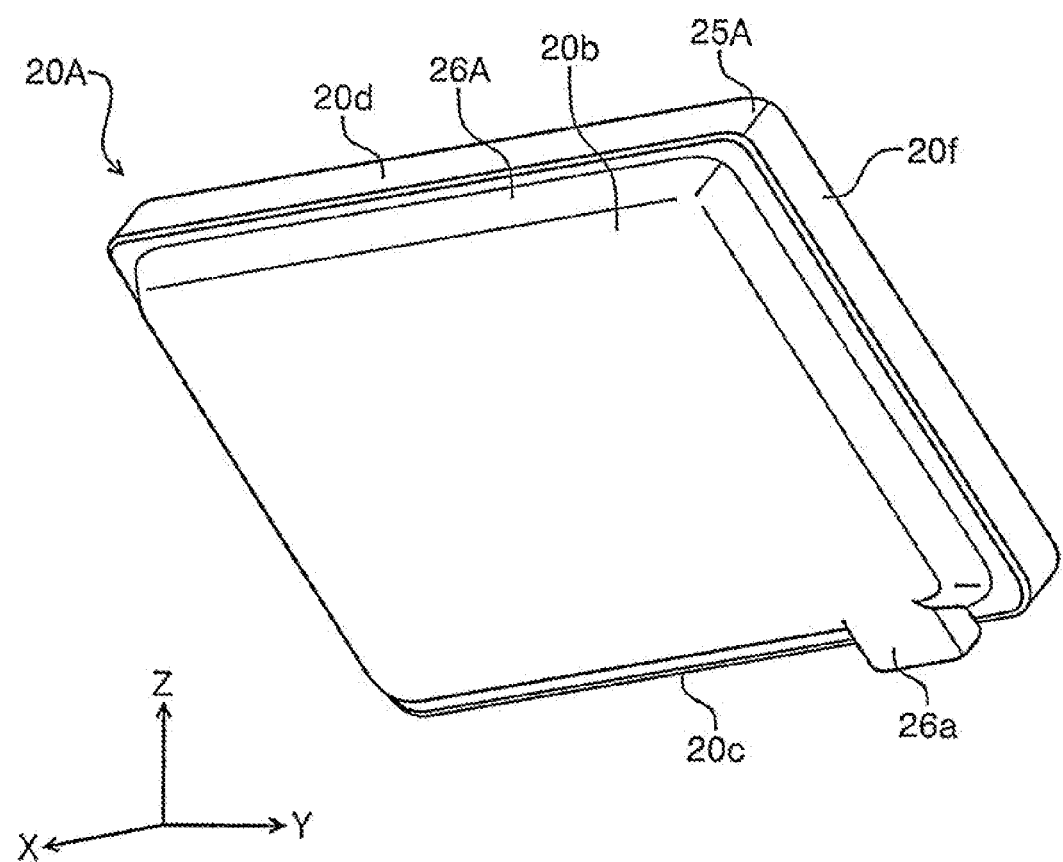
FIG. 3 is a rear perspective view of the tilt panel.
Figure 4:
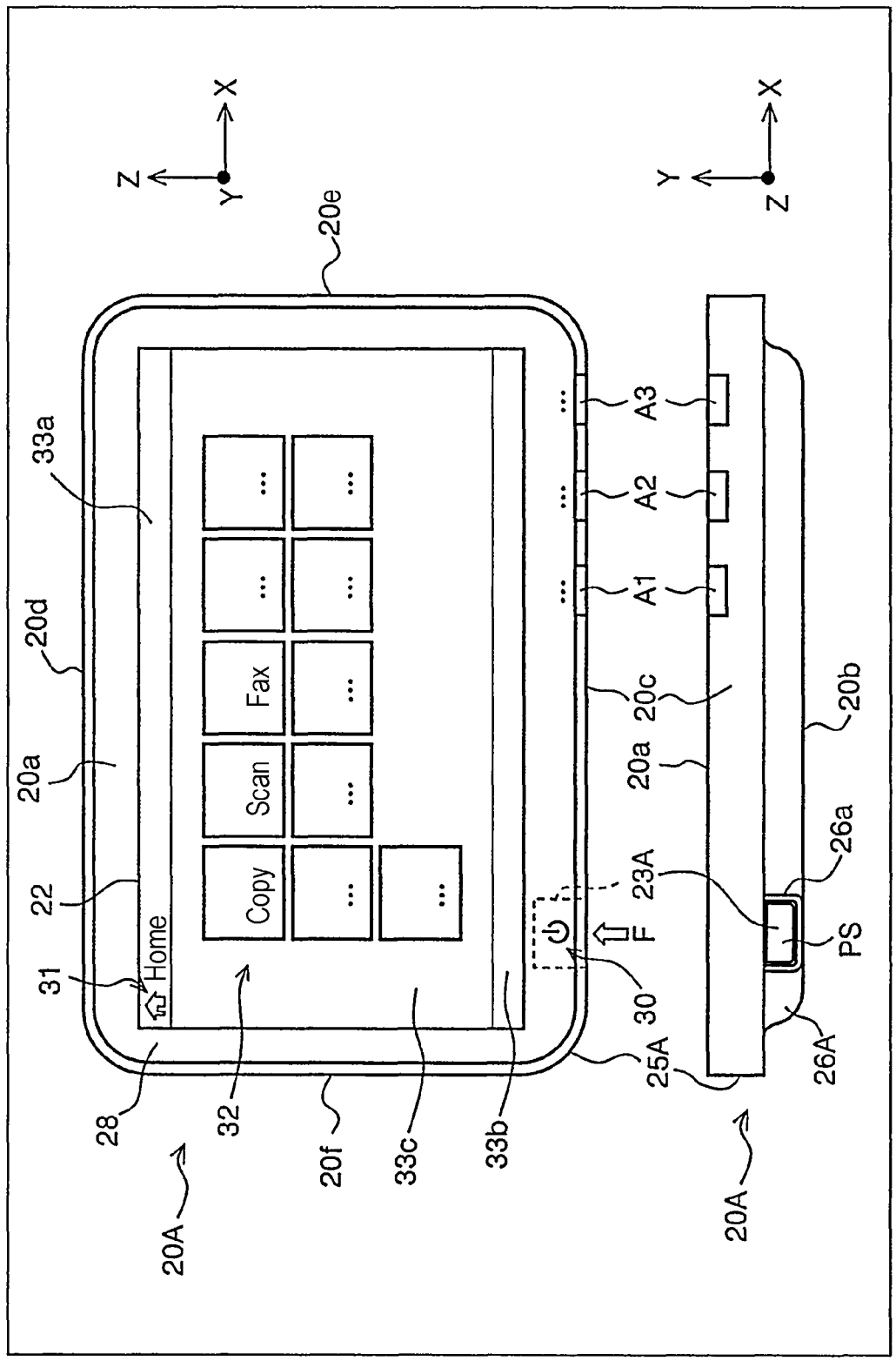
FIG. 4 is front and bottom views of the tilt panel.

The tilt panel 20A has a rear surface 20b formed of a panel frame 26A, as illustrated in FIGS. 3 and 4. In this embodiment, both of the frame member 25A and the panel frame 26A may be made of a resin material and have a black color on the whole.

The lower-side surface 20c of the tilt panel 20A is provided with a power button 23A. The reason why the power button 23A is provided on the furthest side from the pivot shaft 21 is to ensure durability and operability. If a power button is disposed on a side, such as the right-side surface 20e or the left-side surface 20f, of the tilt panel 20A which intersects the pivot shaft 21, the pivot shaft 21 may be damaged by stress generated at the press of the power button, or the main body may hinder a user's operation.

Provided on the lower side of the panel frame 26A near the left-side surface 20f is a cylindrical section 26a that opens downward. Inside the cylindrical section 26a, the power button 23A through which the user turns on or off the main power of the printer 1 is disposed. In other words, the cylindrical section 26a surrounds the power button 23A.

The lower end of the cylindrical section 26a is disposed so as not to protrude downward from the lower-side surface 20c of the tilt panel 20A. The power button 23A has a pressed surface PS that is substantially flush with or higher than the lower end of the cylindrical section 26a. In FIG. 4, the arrow F denotes a direction in which the power button 23A is to be pressed and thus is referred to as the press direction F. The pressed surface PS of the power button 23A is recessed in the press direction F from the lower end of the cylindrical section 26a into the cylindrical section 26a. In short, the power button 23A is disposed so as not to protrude downward from both the cylindrical section 26a and the lower-side surface 20c of the tilt panel 20A. This configuration can reduce the risk of the power button 23A being accidentally pressed. The press direction F of the power button 23A intersects the touch direction of the touch panel 22 at a substantially right angle.

In this embodiment, the power button 23A has a white color and receives light from a light-emitting section (not illustrated). When the printer 1 is activated, the power button 23A transmits the light from the light-emitting section to the outside of the main body 2. The light-emitting section may be a white light-emitting diode (LED).

The front surface 20a of the tilt panel 20A has a power symbol 30 at a location corresponding to the power button 23A. The periphery of the tilt panel 20A as seen in plan view in FIG. 4, which is formed by the frame member 25A, has a black color. Similar to the frame member 25A, an area 28 defined between the frame member 25A and the touch panel 22 also has a black color. The power symbol 30 is written in the area 28 having a black color. For this reason, in this embodiment, the power symbol 30 is written in white within the area 28.

The touch panel 22 having a rectangular shape is provided with a display area that includes: a first sub display area 33a at an upper location; a second sub display area 33b at a lower location; and a main display area 33c at a middle location. The touch panel 22 displays a home icon 31 in a left portion of the first sub display area 33a and also displays "Home" on the right of the home icon 31. Furthermore, the touch panel 22 may display some operation icons and status icons indicating respective statuses of the printer 1, for example, in each of the first sub display area 33a and the second sub display area 33b. In this embodiment, both of the first sub display area 33a and the second sub display area 33b have a gray color; if this gray color is expressed on the 256-level grayscale, its gradation value may range from 117 to 137.

The touch panel 22 displays, in the main display area 33c, an icon group 32 that includes a plurality of icons arranged in a matrix fashion with five rows and three columns, for example, as illustrated in FIG. 4. In this case, only one icon appears in the lowermost row near the left edge. The icon group 32 includes an icon "Copy" on the left of the uppermost row, which is used to cause the printer 1 to perform a copy function by which an original image read by the scanner 3 is recorded on a paper sheet inside the main body 2 and ejected therefrom. The icon group 32 also includes an icon "Scan" on the right of the icon "Copy", which is used to cause the scanner 3 to read an original image. The icon group 32 also includes an icon "Fax" on the right of the icon "Scan", which is used to cause the printer 1 to fax the information on an original image read by the scanner 3. As described above, the touch panel 22 displays icons used to realize some basic functions within an upper left region in the main display area 33c. It should be noted that other icons indicated by the marks "•••" may be used to realize extra functions or may be status lamps, details of which will not be described.

The tilt panel 20A includes status lamps A1, A2, and A3 on the lower-side surface 20c near the lower right corner. The status lamps A1, A2, and A3 indicate respective statuses of the printer 1 by lighting on both the front surface 20a and the lower-side surface 20c of the tilt panel 20A.

As described above, a printer 1 has a tilt panel 20A that includes, on its one side, a power button 23A that can be pressed in a press direction F (see FIG. 4) which intersects a touch direction of a touch panel 22. This configuration suppresses the tilt angle of the tilt panel 20A from being changed by a force generated at the press of the power button 23A. In this embodiment, the press direction F of the power button 23A forms a substantially right angle with the press direction of the touch panel 22. Therefore, the force generated at the press of the power button 23A hardly influences the tilt angle of the tilt panel 20A. It should be noted that the configuration and effect of the tilt panel 20A in the first embodiment are the same as in the remaining embodiments. The configuration successfully reduces the risk of the tilt angle of the tilt panel 20A being accidentally changed or the tilt panel 20A being temporally displaced toward a main body 2 of the printer 1 at the press of the power button 23A. Moreover, the configuration successfully reduces the risk of the power button 23A being accidentally pressed during the operation of the touch panel 22.

The tilt panel 20A may include a frame member 25A on its periphery. The frame member 25A may be a black member, whereas the power button 23A may be formed of a white member. Herein, the black member is an example of a deep color member, and the white member is an example of a light color member. This configuration provides a high color contrast between the periphery of the tilt panel 20A and the power button 23A, thereby contributing to increased visibility of the power button 23A. Instead of the white member, the power button 23A may be formed of a transparent member.

In addition to the above, the power button 23A may be surrounded by a cylindrical section 26a, which is a part of the panel frame 26A formed of a black member, which is an example of the deep color member. This configuration provides a high color contrast between the power button 23A and its surrounding portion, thereby contributing to further increased visibility of the power button 23A formed of a white member.

Figure 2:
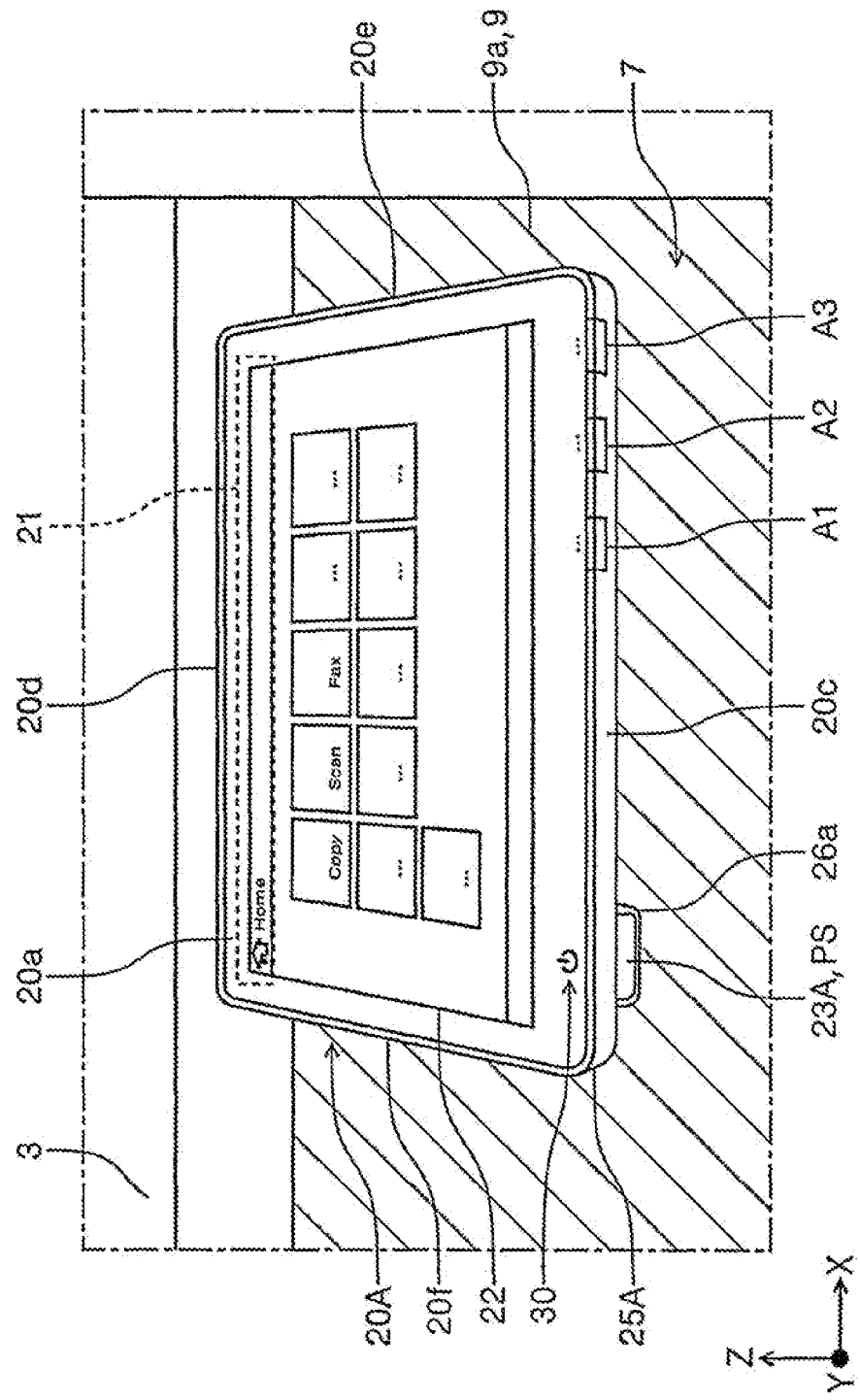
FIG. 2 is a front view of the tilt panel according to a first embodiment of the present disclosure and the ejection space for a paper sheet.

As illustrated in FIG. 2, the power button 23A may at least partly cover an ejection space 7 as seen from the front of the main body 2. The ejection space 7 may be defined by a first surface 9a and a second surface 9b (see FIG. 1) of a casing 9, both of which have a black color as an example of a deep color. In FIG. 2, the hatching area of the first surface 9a schematically represents a black area. This configuration provides a high color contrast between the ejection space 7 and the power button 23A as seen from the front of the main body 2, thereby contributing to further increased visibility of the power button 23A. In addition, the power button 23A may light, thereby further increasing its visibility.

The power button 23A may be disposed away from a front surface 20a of the tilt panel 20A toward the rear surface 20b in the thickness direction of the tilt panel 20A. This configuration successfully further reduces the risk of the power button 23A being accidentally pressed during the operation of the touch panel 22.

Second Embodiment

Figure 5:
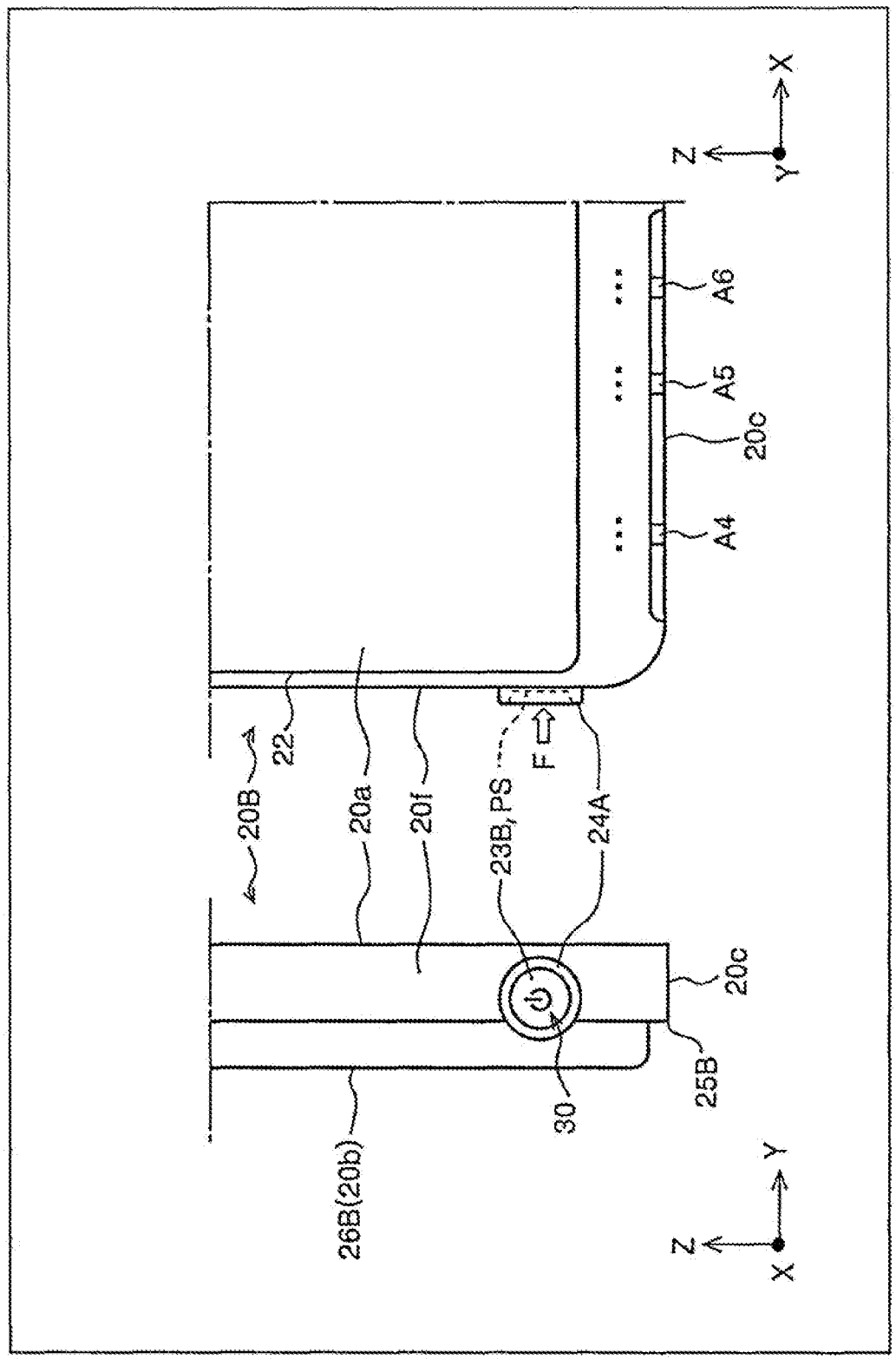
FIG. 5 is partial left-side and front views of a tilt panel according to a second embodiment of the present disclosure.

Next, a description will be given below of a tilt panel 20B according to a second embodiment of the present disclosure, with reference to FIG. 5. It should be noted that FIG. 5 has a plurality of parts illustrating the tilt panel 20B as seen from different directions: the left part of FIG. 5 is a partial left-side view of the tilt panel 20B; and the right part of FIG. 5 is a partial front view of a front surface 20a of the tilt panel 20B. In the following embodiments, components identical to those already described above are given the same characters and will not be described as appropriate. In the second embodiment, the tilt panel 20B includes: a frame member 25B on its periphery; and a rear surface 20b formed of a panel frame 26B. Both of the frame member 25B and the panel frame 26B have a black color on the whole.

The tilt panel 20B includes a power button 23B on a left-side surface 20f. Disposed around the power button 23B is a press suppressor 24A that protrudes from the left-side surface 20f in the left direction. In other words, the power button 23B is surrounded by the press suppressor 24A. The press suppressor 24A is a cylindrical member independent of the frame member 25B which is disposed on the frame member 25B. In this case, the press suppressor 24A has a white color. When a printer 1 is activated, the press suppressor 24A lights by virtue of light rays emitted from a light-emitting section (not illustrated). The power button 23B is formed of a black member and has a pressed surface PS on which a power symbol 30 is written in white. The tilt panel 20B further includes status lamps A4, A5, and A6 that indicate respective statuses of the printer 1 by lighting on both the front surface 20a and a lower-side surface 20c of the tilt panel 20B.

The pressed surface PS of the power button 23B is recessed into the press suppressor 24A in a press direction F. This configuration successfully reduces the risk of the power button 23B being accidentally pressed, for example, during the inclining of the tilt panel 20B.

Third Embodiment

Figure 6:
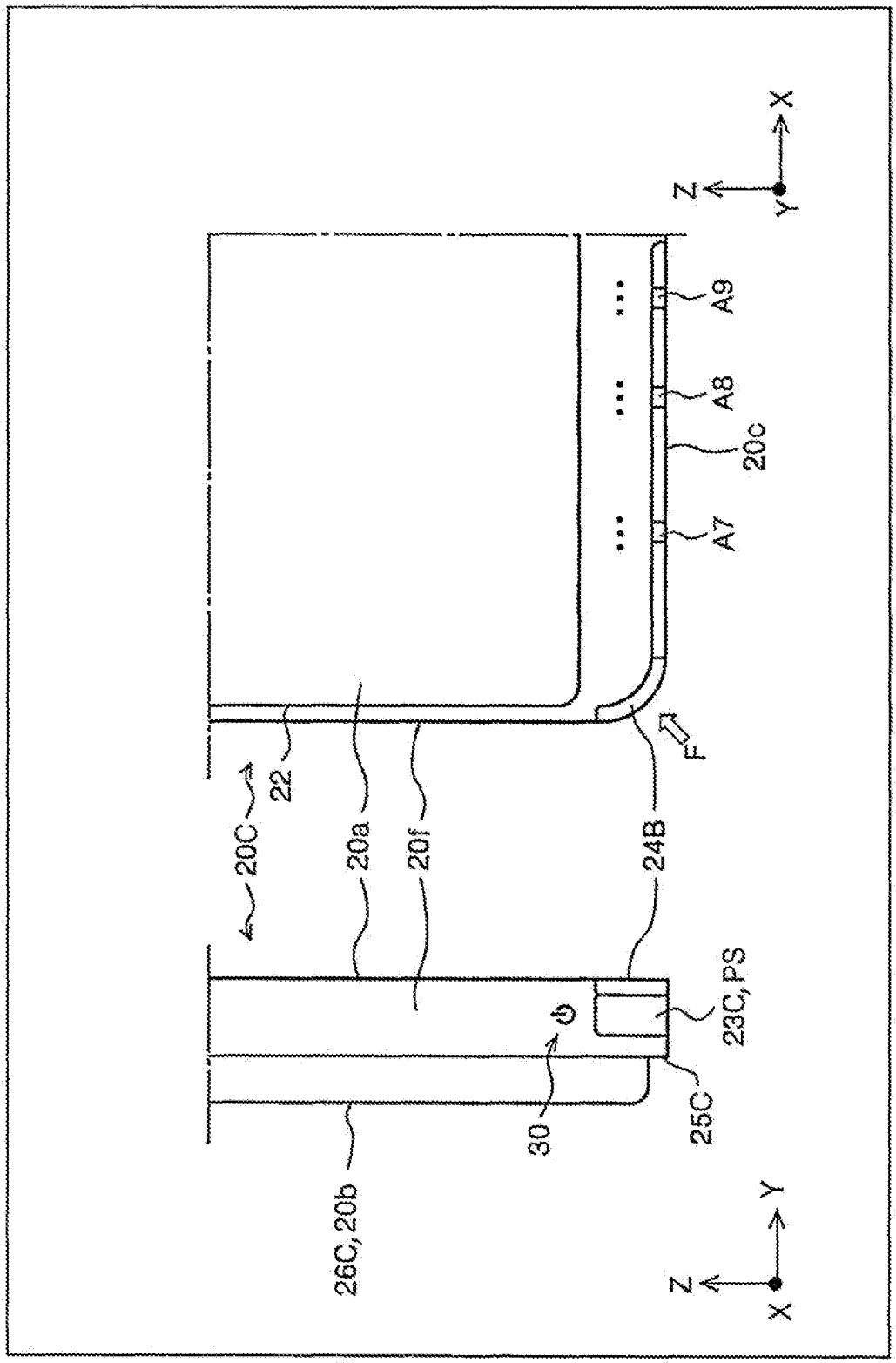
FIG. 6 is partial left-side and front views of a tilt panel according to a third embodiment of the present disclosure.

Next, a description will be given below of a tilt panel 20C according to a third embodiment of the present disclosure, with reference to FIG. 6. It should be noted that FIG. 6 has a plurality of parts illustrating the tilt panel 20C as seen from different directions: the left part of FIG. 6 is a partial left-side view of the tilt panel 20C; and the right part of FIG. 6 is a partial front view of a front surface 20a of the tilt panel 20C. In the third embodiment, the tilt panel 20C includes: a frame member 25C on its periphery; and a rear surface 20b formed of a panel frame 26C. Both of the frame member 25C and the panel frame 26C have a black color on the whole.

The tilt panel 20C includes a power button 23C in the corner at which a left-side surface 20f is joined to a lower-side surface 20c. A press direction F of the power button 23C forms an angle of about 45 degrees with each of the left-side surface 20f and the lower-side surface 20c. Written on the left-side surface 20*f* above the power button 23C is a power symbol 30. The left-side surface 20*f* has a black color, whereas the power symbol 30 has a white color.

The power button 23C is positioned somewhat closer to the rear surface 20*b* than the front surface 20*a* in the thickness direction of the tilt panel 20C. The tilt panel 20C further includes a press suppressor 24B, which is positioned closer to the front surface 20*a* in the thickness direction than the power button 23C is. The press suppressor 24B is formed of a white member and lights by virtue of light rays emitted from a light-emitting section (not illustrated) when a printer 1 is activated. The tilt panel 20C further includes status lamps A7, A8, and A9 that indicate respective statuses of the printer 1 by lighting on both the front surface 20*a* and a lower-side surface 20*c* of the tilt panel 20C.

In the tilt panel 20C, a pressed surface PS of the power button 23C is substantially flush with the corner surfaces of the press suppressor 24B and the frame member 25C. In other words, the pressed surface PS of the power button 23C is substantially flush with the surrounding surfaces. This configuration successfully reduces the risk of the power button 23C being accidentally pressed, for example, during the inclining of the tilt panel 20C.

Fourth Embodiment

Figure 7:
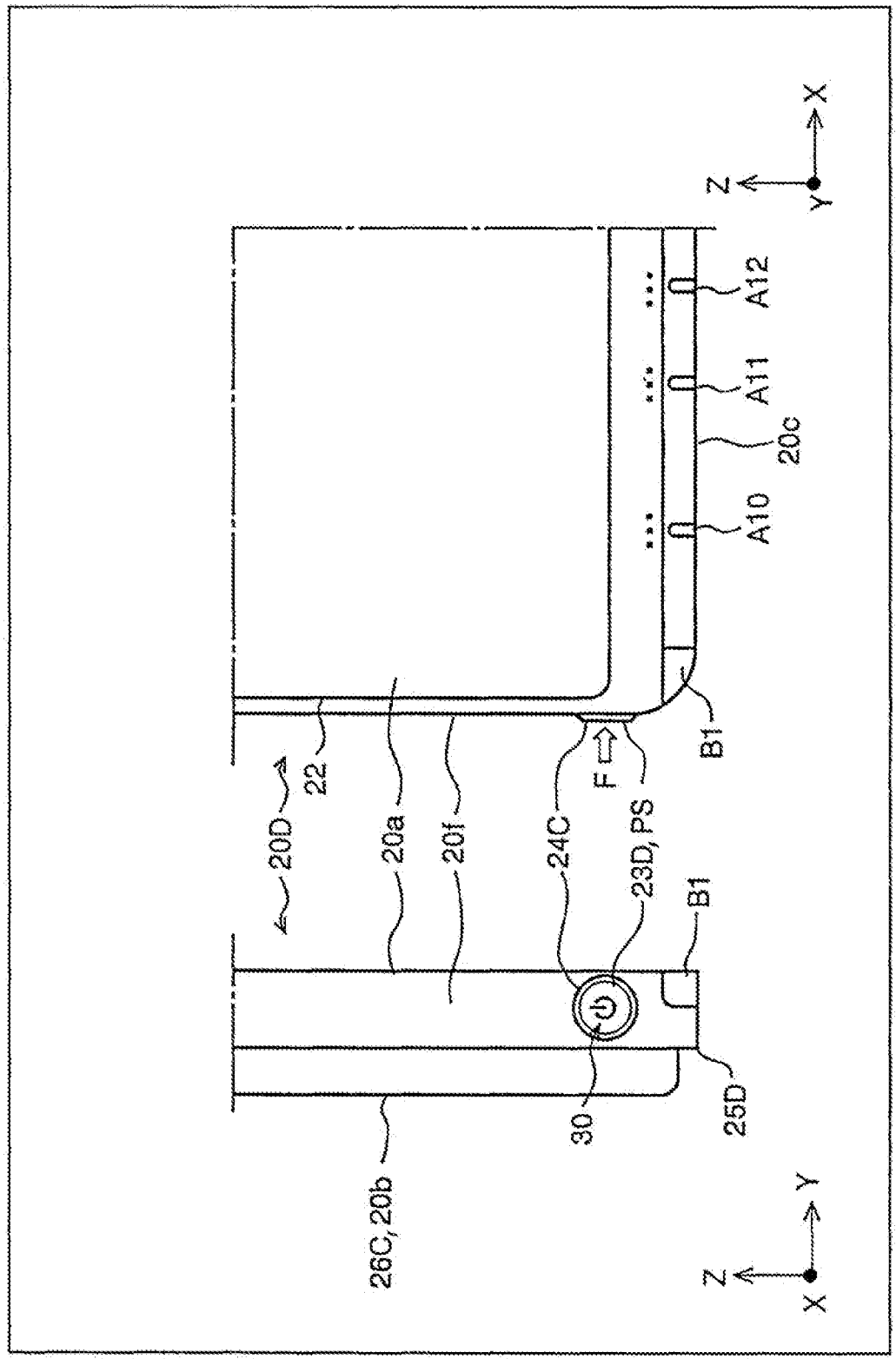
FIG. 7 is partial left-side and front views of a tilt panel according to a fourth embodiment of the present disclosure.

Next, a description will be given below of a tilt panel 20D according to a fourth embodiment of the present disclosure, with reference to FIG. 7. It should be noted that FIG. 7 has a plurality of parts illustrating the tilt panel 20D as seen from different directions: the left part of FIG. 7 is a partial left-side view of the tilt panel 20D; and the right part of FIG. 7 is a partial front view of a front surface 20*a* of the tilt panel 20D. In the fourth embodiment, the tilt panel 20D includes, on its periphery, a frame member 25D having a black color on the whole.

The tilt panel 20D includes a power button 23D on a left-side surface 20*f*. The power button 23D is formed of a black member and has a pressed surface PS on which a power symbol 30 is written in white. In the power button 23D, the pressed surface PS slightly protrudes from the left-side surface 20*f* in the left direction. The tilt panel 20D further includes a power lamp B1 in the corner at which the left-side surface 20*f* is joined to a lower-side surface 20*c*. The power lamp B1 is formed of a white member and lights by virtue of light rays emitted from a light-emitting section (not illustrated) when a printer 1 is activated. The tilt panel 20D further includes status lamps A10, A11, and A12 that indicate respective statuses of the printer 1 by lighting on both the front surface 20*a* and a lower-side surface 20*c* of the tilt panel 20D.

Fifth Embodiment

Figure 8:
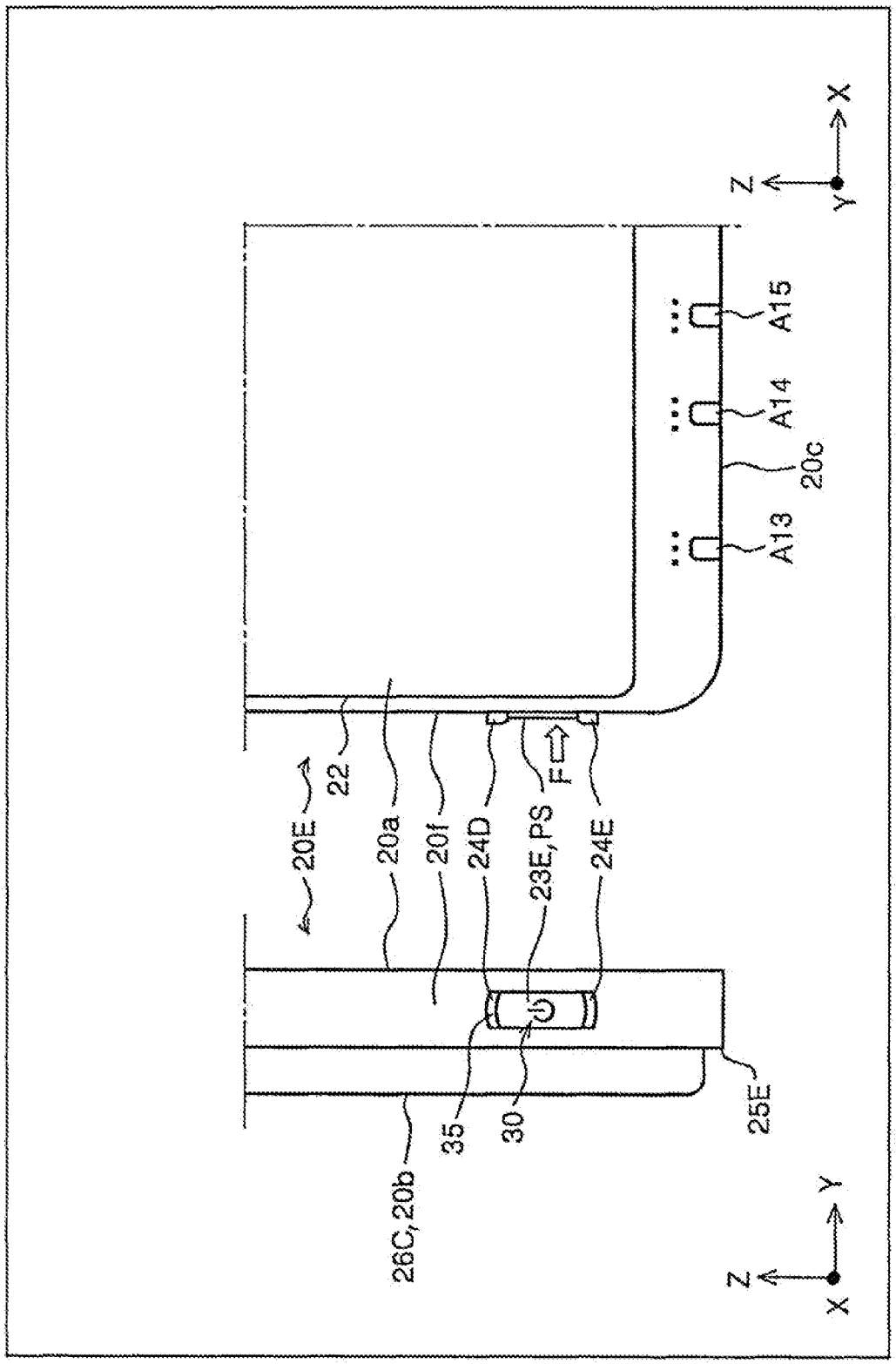
FIG. 8 is partial left-side and front views of a tilt panel according to a fifth embodiment of the present disclosure.

Next, a description will be given below of a tilt panel 20E according to a fifth embodiment of the present disclosure, with reference to FIG. 8. It should be noted that FIG. 8 has a plurality of parts illustrating the tilt panel 20E as seen from different directions: the left part of FIG. 8 is a partial left-side view of the tilt panel 20E; and the right part of FIG. 8 is a partial front view of a front surface 20*a* of the tilt panel 20E. In the fifth embodiment, the tilt panel 20E includes, on its periphery, a frame member 25E having a black color on the whole. The tilt panel 20E further includes a power button 23E on a left-side surface 20*f*. Disposed above the power button 23E is a press suppressor 24D, which protrudes from the left-side surface 20*f* in the left direction. Disposed below the power button 23E is a press suppressor 24E, which also protrudes from the left-side surface 20*f* in the left direction. Both of the press suppressors 24D and 24E, which are individually attached to the frame member 25E, have a white color.

Of the press suppressors 24D and 24E, only the press suppressor 24D lights by virtue of light rays emitted from a light-emitting section (not illustrated) when a printer 1 is activated. Alternatively, only the press suppressor 24E or both the press suppressors 24D and 24E may light. The power button 23E is formed of a black member and has a pressed surface PS on which a power symbol 30 is written in white. The tilt panel 20E further includes status lamps A13, A14, and A15 that indicate respective statuses of a printer 1 by lighting on both a front surface 20*a* and a lower-side surface 20*c* of the tilt panel 20E.

The pressed surface PS of the power button 23E is recessed into both the press suppressors 24D and 24E in a press direction F. This configuration successfully reduces the risk of the power button 23E being accidentally pressed, for example, during the inclining of the tilt panel 20E.

Sixth Embodiment

Figure 9:
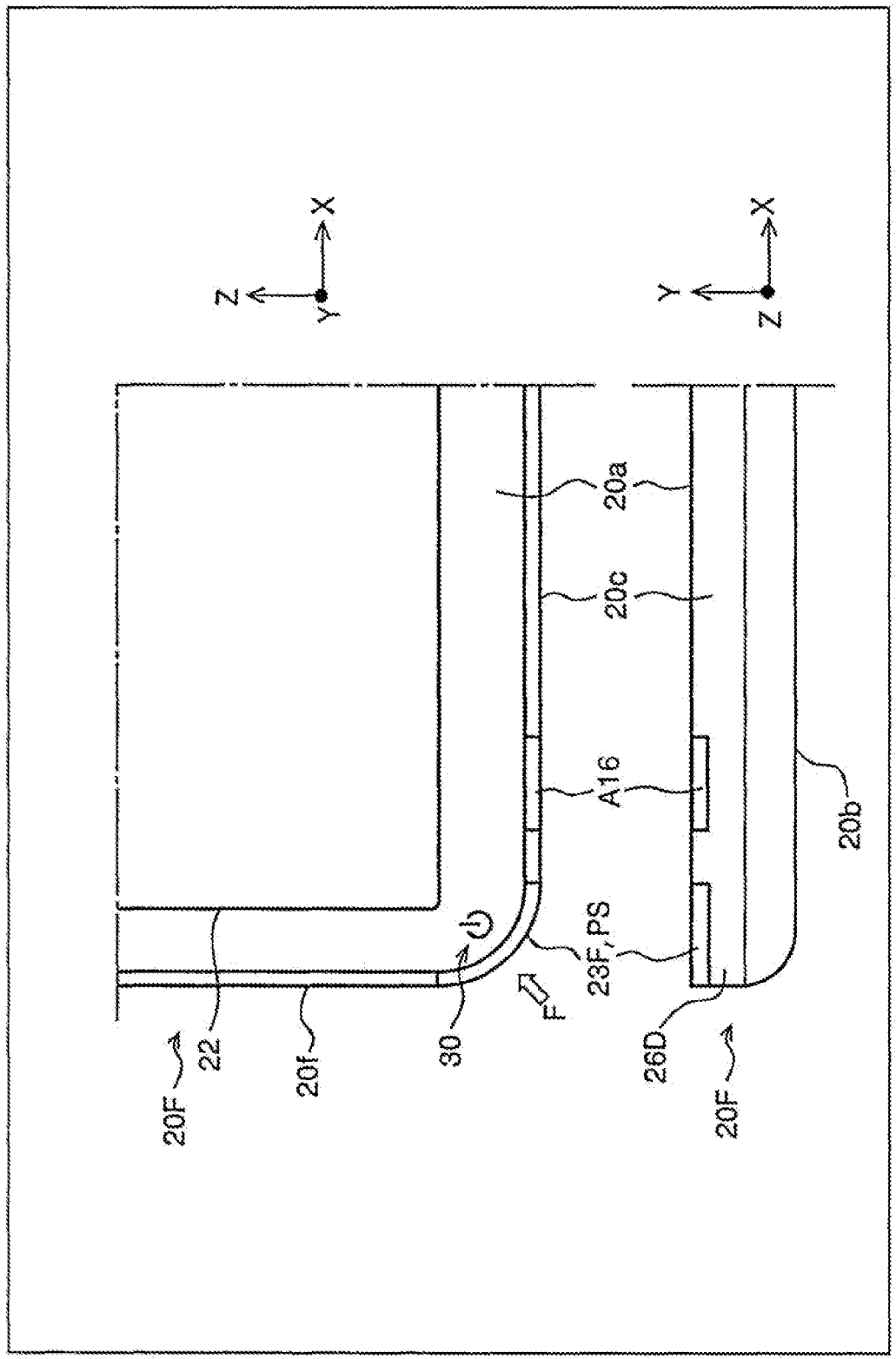
FIG. 9 is partial front and bottom views of a tilt panel according to a sixth embodiment of the present disclosure.

Next, a description will be given below of a tilt panel 20F according to a sixth embodiment of the present disclosure, with reference to FIG. 9. It should be noted that FIG. 9 has a plurality of parts illustrating the tilt panel 20F as seen from different directions: the lower part of FIG. 9 is a partial bottom view of the tilt panel 20F; and the upper part of FIG. 9 is a partial front view of a front surface 20*a* of the tilt panel 20F. In the sixth embodiment, the tilt panel 20F includes a panel frame 26D having a black color on its periphery and rear surface. The tilt panel 20F further includes a power button 23F in the corner at which a left-side surface 20*f* is joined to a lower-side surface 20*c*. The power button 23F is exposed from the lower-side surface 20*c*, the left-side surface 20*f*, and the front surface 20*a* of the tilt panel 20F to the outside, so that a press direction F of the power button 23F forms an angle of about 45 degrees with each of the left-side surface 20*f* and the lower-side surface 20*c*. The tilt panel 20F further includes a power symbol 30 on the front surface 20*a* at a location corresponding to the power button 23F. The outer area of a touch panel 22 has a black color, whereas the power symbol 30 has a white color. The power button 23F is formed of a white member and lights by virtue of light rays emitted from a light-emitting section (not illustrated) when a printer 1 is activated. The tilt panel 20F further includes a status lamp A16 that indicates a status of the printer 1 by lighting on both the front surface 20*a* and the lower-side surface 20*c*.

Seventh Embodiment

Figure 10:
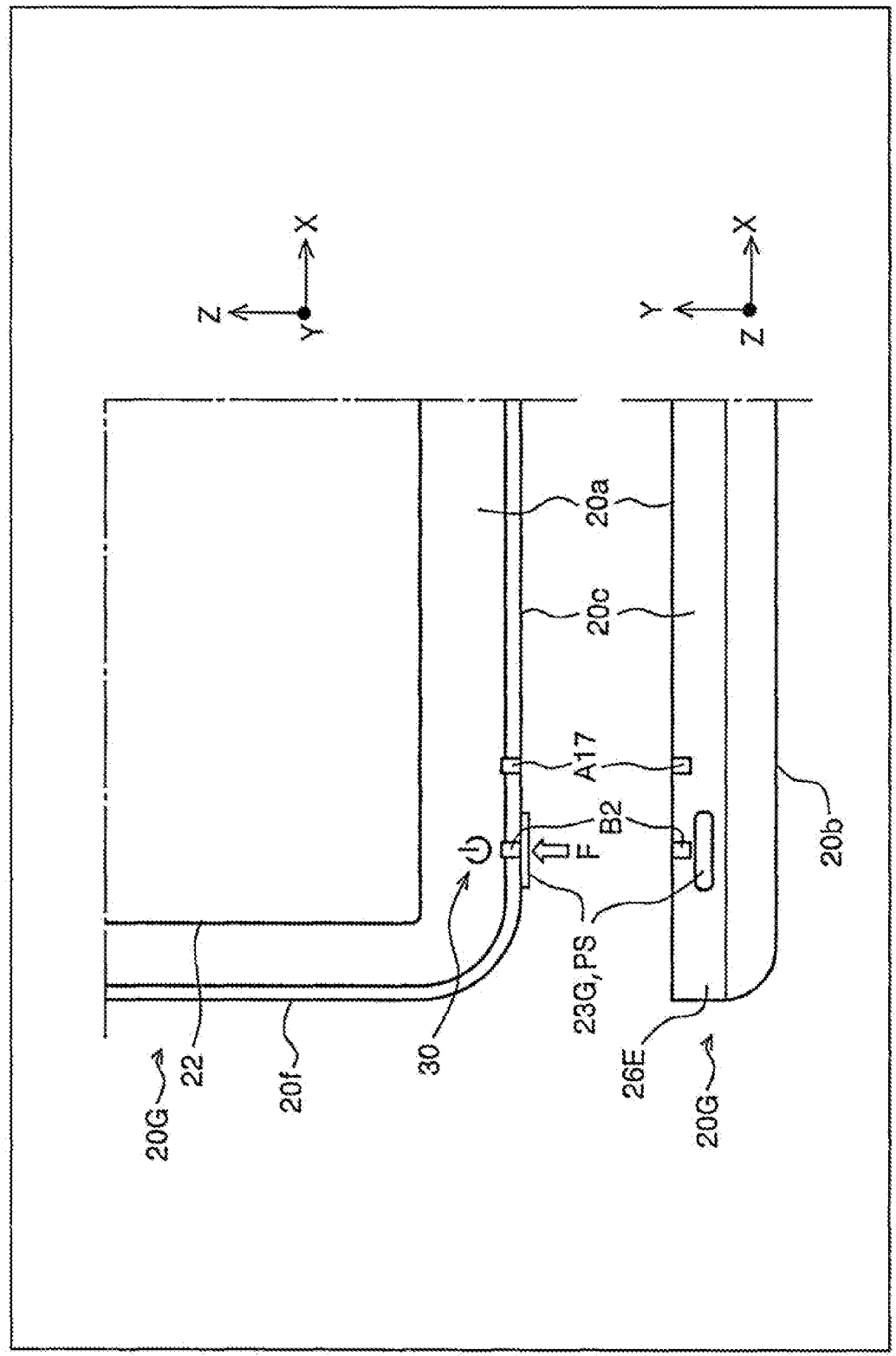
FIG. 10 is partial front and bottom views of a tilt panel according to a seventh embodiment of the present disclosure.

Next, a description will be given below of a tilt panel 20G according to a seventh embodiment of the present disclosure, with reference to FIG. 10. It should be noted that FIG. 10 has a plurality of parts illustrating the tilt panel 20G as seen from different directions: the lower part of FIG. 10 is a partial bottom view of the tilt panel 20G; and the upper part of FIG. 10 is a partial front view of a front surface 20*a* of the tilt panel 20G. In the seventh embodiment, the tilt panel 20G includes a panel frame 26E having a black color on its periphery and rear surface. The tilt panel 20G further includes, on a lower-side surface 20*c*, a power button 23G having a pressed surface PS slightly protruding downward from the lower-side surface 20*c*. The tilt panel 20G further includes a power symbol 30 on the front surface 20a at a location corresponding to the power button 23G. The outer area of a touch panel 22 has a black color, whereas the power symbol 30 has a white color. The tilt panel 20G further includes a power lamp B2 directly below the power symbol 30; the power lamp B2 is formed of a white member and lights by virtue of light rays emitted from a light-emitting section (not illustrated) when a printer 1 is activated. The tilt panel 20G further includes a status lamp A17 that indicates a status of the printer 1. The status lamp A17 and the power button B2 light on both the front surface 20a and the lower-side surface 20c of the tilt panel 20G.

Eighth Embodiment

Next, a description will be given below of a tilt panel 20H according to an eighth embodiment of the present disclosure, with reference to FIG. 11. It should be noted that FIG. 11 has a plurality of parts illustrating the tilt panel 20H as seen from different directions: the lower part of FIG. 11 is a partial bottom view of the tilt panel 20H; and the upper part of FIG. 11 is a partial front view of a front surface 20a of the tilt panel 20H. In the eighth embodiment, the tilt panel 20H includes a panel frame 26F having a black color on its periphery and rear surface. The tilt panel 20H further includes, on a lower-side surface 20c, a power button 23H having a pressed surface PS slightly protruding downward from the lower-side surface 20c. The tilt panel 20H further includes a power symbol 30 on the front surface 20a at a location corresponding to the power button 23H. The outer area of a touch panel 22 has a black color, whereas the power symbol 30 has a white color.

The tilt panel 20H further includes, on the left of the power symbol 30, a power lamp B3 that is formed of a white member and lights by virtue of light rays emitted from a light-emitting section (not illustrated) when a printer 1 is activated. The tilt panel 20H further includes a status lamp A18 that indicates a status of the printer 1. In this embodiment, the power lamp B3 and the status lamp A18 differ from the power lamp B2 and the status lamp A17, respectively, illustrated in FIG. 10 in that they extend from the lower-side surface 20c toward the touch panel 22. Each of the power lamp B3 and the status lamp A18 lights on both a front surface 20a and the lower-side surface 20c of the tilt panel 20H.

Ninth Embodiment

Next, a description will be given below of a tilt panel 20J according to a ninth embodiment of the present disclosure, with reference to FIG. 12. It should be noted that FIG. 12 has a plurality of parts illustrating the tilt panel 20J as seen from different directions: the lower part of FIG. 12 is a partial bottom view of the tilt panel 20J; and the upper part of FIG. 12 is a partial front view of a front surface 20a of the tilt panel 20J. In the ninth embodiment, the tilt panel 20J includes a panel frame 26G having a black color on its periphery and rear surface. The tilt panel 20J further includes, on a lower-side surface 20c, a power button 23J having a pressed surface PS substantially flush with the lower-side surface 20c.

Written on the pressed surface PS of power button 23J is a power symbol 30. The pressed surface PS of the power button 23J has a black surface, whereas the power symbol 30 has a white surface. The tilt panel 20J further includes a power lamp B4 around the power button 23J. The power lamp B4 is visually perceived as having a ring shape when seen from the lower-side surface 20c and as having a rectangular shape when seen from the front surface 20a of a tilt panel 20J. The power lamp B4 is formed of a white member and lights by virtue of light rays emitted from a light-emitting section (not illustrated) when a printer 1 is activated. The tilt panel 20J further includes a status lamp A19. Both of the power lamp B4 and the status lamp A19 indicate respective statuses of the printer 1 by lighting on both the front surface 20a and the lower-side surface 20c of the tilt panel 20J.

In the foregoing embodiments, a press direction F of a power button intersects a touch direction of a touch panel. Therefore, the force generated at the press of the power button hardly influences a tilt angle of a tilt panel. This configuration successfully reduces the risk of the tilt angle of the tilt panel being accidentally changed or the tilt panel being temporally displaced toward a main body of a printer at the press of the power button. Moreover, the configuration successfully reduces the risk of the power button being accidentally pressed during the operation of the touch panel.

In the foregoing embodiments, a pivot shaft 21 is provided on the upper side of a tilt panel in plan view; however, the pivot shaft 21 may be provided in the center or on the lower side of the tilt panel in plan view.

In the foregoing embodiments, the central axis of a pivot shaft 21 extends horizontally; however, the central axis of the pivot shaft 21 may extend vertically.

Alternatively, the pivot shaft 21 may support a tilt panel through a universal joint, for example, in which case a user can freely change the attitude of the tilt panel.

In the foregoing embodiments, a tilt panel is provided in a main body 2; however, the tilt panel may be provided in a scanner 3.

In the foregoing embodiments, a tilt panel is provided in a recording apparatus implemented by an MFP having a recording function and a scanning function; however, the tilt panel may be provided in a recording apparatus that has only a recording function.

Alternatively, the tilt panel may be provided in a recording apparatus, called a medium scanning apparatus, that has only a scanning function.

In the foregoing first and seventh to ninth embodiments, a power button is provided on a lower-side surface 20c; however, the power button may be provided on an upper-side surface 20d. In the foregoing second, fourth, and fifth embodiments, a power button is provided on a left-side surface 20f; however, the power button may be provided on a right-side surface 20e. In the foregoing third and sixth embodiments, a power button is provided in the corner at which a left-side surface 20f is joined to a lower-side surface 20c; however, the power button may be provided in any other corner. The colors of the above components are examples, and obviously they have any other colors.

The present disclosure is not limited to the foregoing embodiments and may undergo various modifications within the scopes of the claims. Obviously, those modifications fall within the scope of the present disclosure.

What is claimed is:
1. A recording apparatus comprising:
a recording section that records information on a medium;
a main body provided with the recording section; and
a tilt panel that includes a touch panel disposed on a front surface of the tilt panel, the tilt panel allowing a setting operation of the main body, the tilt panel being pivotably connected to a surface of the main body so that the tilt panel pivots about an axis that is parallel to the surface of the main body when the tilt panel is pressed in a touch direction that is perpendicular to the front surface of the tilt panel, the tilt panel including a power button disposed on a part of a periphery of the tilt panel, a press direction of the power button intersecting the touch direction of the touch panel.

2. The recording apparatus according to claim 1, wherein the press direction of the power button forms a substantially right angle with the touch direction of the touch panel.

3. The recording apparatus according to claim 1, wherein the periphery of the tilt panel is formed of a deep color member, and the power button is formed of a light color member or a transparent member.

4. The recording apparatus according to claim 3, wherein the power button is surrounded by the deep color member.

5. The recording apparatus according to claim 4, wherein the main body has a casing defining an ejection space, the medium on which the information was recorded is to be ejected into the ejection space, the power button is disposed so as to at least partly cover the ejection space as seen from front of the main body, and the casing is formed of a deep color member.

6. The recording apparatus according to claim 5, wherein the power button is configured to light.

7. The recording apparatus according to claim 1, wherein the power button is disposed on a side of the tilt panel which is furthest from a pivot shaft of the tilt panel.

8. The recording apparatus according to claim 1, wherein the power button is disposed apart from a front surface toward a rear surface of the tilt panel in a thickness direction of the tilt panel.

9. The recording apparatus according to claim 1, the power button has a surface to be pressed, the surface being substantially flush with or depressed into a surface around the power button in the press direction.

* * * * *